(12) United States Patent
Kasten et al.

(10) Patent No.: US 6,492,785 B1
(45) Date of Patent: Dec. 10, 2002

(54) VARIABLE CURRENT LIMIT CONTROL FOR VEHICLE ELECTRIC DRIVE SYSTEM

(75) Inventors: Robert Eugene Kasten, Moline, IL (US); Bruce Craig Newendorp, Cedar Falls, IA (US); Norman Frederick Lemmon, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 179 days.

(21) Appl. No.: 09/604,148

(22) Filed: Jun. 27, 2000

(51) Int. Cl.$^7$ ............................................... H02K 17/32
(52) U.S. Cl. ....................... 318/434; 318/139; 318/140; 318/432; 318/445; 180/65.1; 180/65.2; 180/65.3; 180/165
(58) Field of Search ................................ 318/139, 432, 318/434, 140, 145; 180/65.1, 65.2, 65.3, 165

(56) References Cited

U.S. PATENT DOCUMENTS

| | | | |
|---|---|---|---|
| 4,096,418 A | | 6/1978 | Marumoto et al. ............ 318/12 |
| 4,514,665 A | * | 4/1985 | Meloick ...................... 318/139 |
| 4,740,898 A | * | 4/1988 | McKee et al. ............... 364/426 |
| 4,772,829 A | * | 9/1988 | Pickering et al. ............ 318/139 |
| 5,070,959 A | | 12/1991 | Grabowski ................... 180/167 |
| 5,101,688 A | * | 4/1992 | Pearce et al. ................. 74/861 |
| 5,105,675 A | * | 4/1992 | Langford et al. .............. 74/335 |
| 5,161,405 A | * | 11/1992 | Macqueene ................... 73/1 R |
| 5,162,707 A | | 11/1992 | Joseph ......................... 318/60 |
| 5,172,784 A | * | 12/1992 | Varela et al. ............... 180/65.4 |
| 5,251,132 A | * | 10/1993 | Bulgrien ..................... 364/424.1 |
| 5,265,018 A | * | 11/1993 | Sokol et al. ................ 364/424.1 |
| 5,280,223 A | | 1/1994 | Grabowski et al. ......... 318/139 |
| 5,343,971 A | | 9/1994 | Heidelberg et al. ........ 180/65.4 |
| 5,481,460 A | * | 1/1996 | Masaki et al. ........... 364/424.07 |
| 5,495,906 A | | 3/1996 | Furutani ....................... 180/65.2 |
| 5,568,023 A | * | 10/1996 | Grayer et al. ................ 318/139 |
| 5,627,438 A | * | 5/1997 | Barrett ......................... 318/139 |
| 6,053,842 A | * | 4/2000 | Kitada et al. ..................... 477/5 |
| 6,150,780 A | * | 11/2000 | Young et al. ................ 318/270 |

FOREIGN PATENT DOCUMENTS

EP          0 693 392 A1      1/1996

* cited by examiner

Primary Examiner—Robert E. Nappi
Assistant Examiner—Tyrone Smith

(57) ABSTRACT

A vehicle electric drive system includes an internal combustion engine, an electric motor/generator driven by the engine, a first inverter/rectifier coupled to motor/generator, a bus coupled to the first inverter/rectifier, a second inverter/rectifier coupled to the bus, and a traction motor/generator coupled to an output of the second inverter/rectifier, an operator speed control member, and a controller coupled to the second inverter/rectifier for controlling a current output of the second inverter/rectifier as a function of a position of the speed control member. Also included is an operator controlled foot pedal and a transducer coupled to the foot pedal and generating a signal representing foot pedal position which is supplied to the controller. The controller limits current supplied by the second inverter/rectifier to the traction motor/generator to a limit current as a function of the transducer signal. The controller, foot pedal and transducer cooperate to vary the limit current in response to movement of the foot pedal. A spring biases the foot pedal to an upper limit position. The controller causes the second inverter/rectifier to supply to the traction motor/generator a maximum amount of current, (such maximum current being a function of the foot pedal position), but not more than that required to achieve the speed commanded by the speed control.

10 Claims, 3 Drawing Sheets

VARIABLE CURRENT LIMIT CONTROL FOR VEHICLE ELECTRIC DRIVE SYSTEM

BACKGROUND OF THE INVENTION

This invention relates to an electric drive system for a vehicle.

Vehicle electric drive systems or AC electric traction drives have been proposed to overcome some of the deficiencies of mechanical transmission systems, such as a limited number of speeds, increased costs of engineering and manufacturing components, and limiting vehicle configuration options. Such an electric drive system, as shown in U.S. Pat. No. 5,568,023 issued Oct. 22, 1996 to Grayer et al., typically includes an engine-driven 3-phase electric motor/generator coupled to an inverter/rectifier, which, in turn, is coupled to a DC bus. The bus feeds an inverter/rectifier which supplies power to a traction motor/generator which drives an axle or a wheel. The inverter/rectifiers invert the DC current on the bus to 3-phase AC current at a frequency to drive the wheels at the speed directed by the operator. An external power source applied to the tractor through the drive wheels and tending to move the tractor at a speed faster than the requested speed will cause the motors to act as generators and the whole sequence of power conversion will be reversed, regenerating mechanical power back into the engine. This regeneration action causes the engine to absorb power from externally forced loads in a manner similar to that of current mechanical transmissions.

Typically, the speed of the traction motor/generators is controlled by controlling the frequency of the current driving the motor. When the speed control is engaged, the drive will engage with full force or torque authority. Operators of conventional tractors with mechanical transmissions can depress a clutch pedal to release or reduce the torque driving the vehicle. By slowly engaging or disengaging such a mechanical clutch, the operator can control the torque being applied by the engine to move the vehicle. Therefore, by modulating the engagement of the clutch, the operator controls movement of the vehicle by controlling the driving force or torque that the wheels can exert. It would be desirable to have a similar clutch type control capability in an electric drive system.

SUMMARY OF THE INVENTION

Accordingly, an object of this invention is to provide a vehicle electric drive system with a control which operates in a manner similar to a clutch control of a conventional mechanical drive vehicle.

These and other objects are achieved by the present invention, wherein a vehicle electric drive system includes an engine driven electric motor/generator, a first inverter/rectifier coupled to motor/generator, a bus coupled to the first inverter/rectifier, a second inverter/rectifier coupled to the bus, and a traction motor/generator coupled to an output of the second inverter/rectifier. Electronic controllers control operation of the inverter/rectifiers in response to an operator speed control member. In addition, an operator controlled foot pedal is coupled to a transducer which generates a limit command signal representing the position of the foot pedal. An electronic control unit receives the limit command signal and limits current supplied by the second inverter/rectifier to the traction motor/generator to a limit current which is a function of the limit command signal and motor speed.

DESCRIPTION OF THE PREFERRED EMBODIMENT

Figure 1:
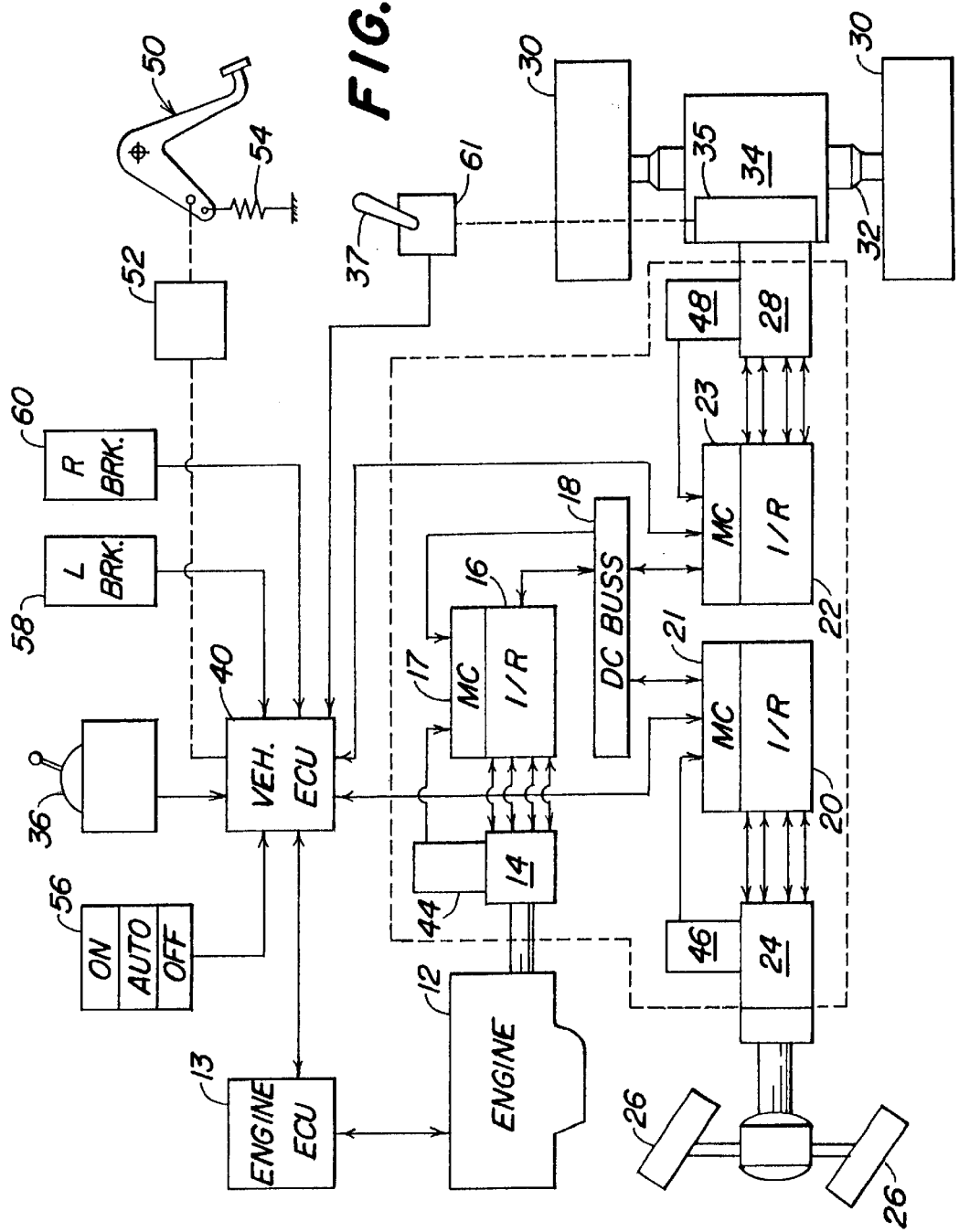
FIG. 1 is a simplified schematic diagram of a vehicle electric drive system according to the present invention.

Referring to FIG. 1, a vehicle electric drive system 10 includes an internal combustion engine 12 controlled by electronic engine control unit (ECU) 13. The engine 12 drives a 3-phase electric motor/generator 14 which supplies electrical power to and receives power from a bi-directional inverter/rectifier 16, which is coupled to a high voltage DC bus 18. The bus 18 feeds power to and receives power from bi-directional inverter/rectifiers 20 and 22. Inverter/rectifier 20 is coupled to traction motor/generator 24 which drives and receives power from front wheels 26. Inverter/rectifier 22 is coupled to traction motor/generator 28 which drives and receives power from rear wheels 30 via axle 32 via speed reducer 34. Speed reducer 34 includes a high/low range box 35 which is controlled by a high/low range selector lever 37. Each inverter/rectifier 16, 20 and 22 is controlled by a corresponding micro-controller 17, 21 and 23, respectively. There are no batteries involved in the drive train as are normally used on drives for automobiles and buses.

The motors 24 and 28 are preferably DC brushless permanent magnet motors. Preferably, the rear motor 28 drives the rear axle through a two speed mechanically shifted gear box. Two speed gearing results in efficient motor operation because high gear provides the required speed to the axle for transport speeds, while the low gear provides the required torque to the axle for heavy pulling at low speeds.

Figure 2:
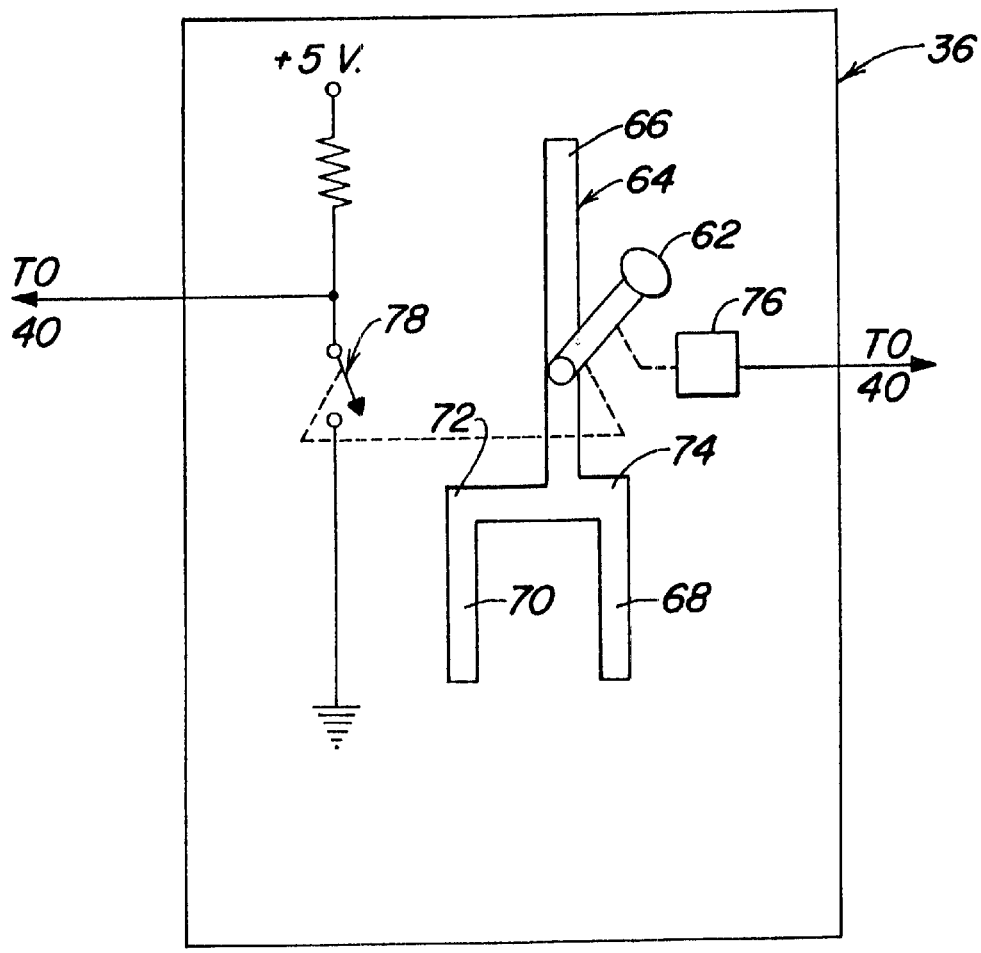
FIG. 2 is a simplified schematic diagram of a operator control assembly for use with the present invention.
Figure 3:
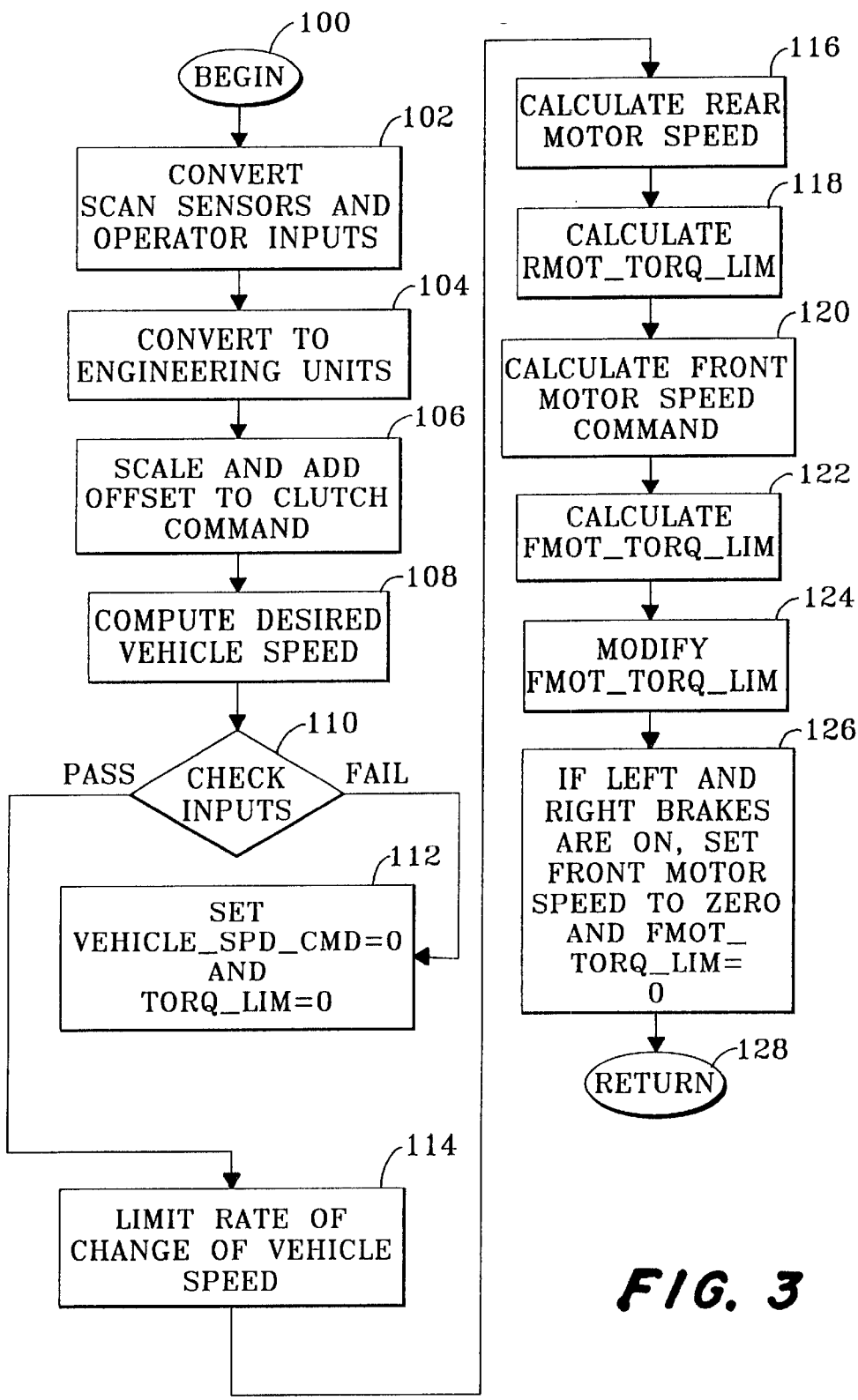
FIG. 3 is a logic flow diagram of an algorithm executed by the vehicle ECU of the control system of FIG. 1.

An electronic vehicle control unit VCU 40 communicates with an operator control assembly 36, the ECU 13, various sensors (not shown), and the micro-controllers 21 and 23. As best seen in FIG. 2, control assembly 36 includes a speed control lever 62 (or pedal or the equivalent) movable in a guide slot 64 with a forward branch 66, a reverse branch 68, a park branch 70, a neutral position 72 and a hold zero speed position 74. Control assembly 36 also includes conventional transducers 76 which are operatively coupled to the lever 62 and which generate lever position signals which are communicated to the VCU 40. Control assembly may be similar to the shift quadrant which is used on production John Deere 7000 Series tractors. Control assembly 36 also preferably includes a torque hold switch 78 which is operatively coupled to the lever 62 and which generates a torque hold signal when lever 62 is in a neutral or park position.

Referring again to FIG. 1, rotor position sensors 44, 46 and 48 are coupled to each of the motor/generators 14, 24 and 28 and supply a rotation position signal to the corresponding micro-controllers 21 and 23, 42, which derive a speed signal therefrom. The inverter/rectifiers 20, 22 invert and convert the DC bus current to a 3-phase AC current at a frequency to drive the wheels at a speed commanded by the operator via the speed control lever 62. The rotor position sensors 46, 48, and the micro-controllers 21, 23 form a closed speed control loop for each of the electric drive motors 24 and 28, in which the microcontrollers 21, 23 calculate a speed error from the difference between the commanded speed from lever 62 and the actual speed derived from sensors 46, 48, and a current is applied to the motors as a function of the speed error.

According to the present invention, an additional operator control device, preferably a foot operated pedal 50, is coupled to a transducer 52, such as a potentiometer, which generates a transducer signal (or limit command signal) representing the position of the pedal 50. A spring 54 biases the pedal 50 to its raised position. A three position front wheel drive FWD switch 56, and left and right brake switches 58 and 60 are also coupled to the VCU 40. The brake switches are preferably operatively coupled to left and right brake pedals (not shown). The VCU 40 receives signals from the switches 56, 58 and 60, the speed control lever 62 and the clutch pedal transducer 52. The VCU 40 also receives signals from a range box sensor switch 61 which provides VCU 40 with a signal representing the status of the high/low range box 35. The VCU 40 executes an algorithm represented in simplified form by FIG. 2, and generates a torque limit signal which has a value which can vary from 0 to 100%. The inverter/rectifiers 20, 22 and their associated microcontrollers 21, 23 cooperate in response to the torque limit signal to limit the current supplied to the traction motor/generators 24, 28 to limit the torque thereof accordingly.

Referring now to FIG. 2, the algorithm begins at step 100 when called from a main algorithm loop (not shown) which generates a vehicle speed command value which is applied to the micro-controllers 21, 23. Step 102 scans the various sensors and operator inputs and converts analog signals to digital signals. Step 104 converts the values from step 102 to engineering units. Step 106 scales and adds an offset to the signal from transducer 52 to form a clutch command signal so that the range of the clutch command signal corresponds to an upper portion of the movement range of the pedal 50. Preferably, 100% clutch command signal will correspond to a position of pedal 50 slightly below its fully raised position, and a zero clutch command signal will correspond to when pedal 50 is depressed about 75%. Step 108 calculates a vehicle speed command signal (Veh_spd_cmd) based on a vehicle mode and the position of the speed control lever 62.

Step 110 checks the consistency of the inputs commands and performs a safety check. If there is a failure, step 110 directs the algorithm to step 112 which sets a vehicle speed command value to zero and sets a torque limit value to zero, else to step 114.

Step 114 limits a rate of change of the vehicle speed command value.

Step 116 calculates a rear motor speed required to achieve the desired speed, based on the vehicle speed command value, Veh_spd_cmd, and upon a rear gear ratio, as per the following C language computer statements:

RRGrat=Hi_Gear_Ratio;
if(Lo_Rng)
RRGrat=Lo_Gear_Ratio;
Rmot_Spd_Cmd=RRGrat * veh_spd_cmd;

Veh_spd_cmd is the vehicle speed command computed from operator inputs, limited by actual vehicle speed. It is a function of an effective rear gearbox/tire ratio value, RRGrat determined from a range box sensor 61. Lo_Rng is True when selector 37 is in its low speed range position. Hi_Gear_Ratio is the ratio of rear wheel speed to vehicle speed in the high speed range of the range box 35. It includes the effect of rear tire rolling radius as well as the actual gear reduction. Lo_Gear_Ratio is the ratio of rear wheel speed to vehicle speed in the low speed range. Finally, the rear motor speed command, Rmot_Spd_Cmd, is calculated as a function of gear ratio, RRGrat, times veh_spd_cmd.

Step 118 calculates a rear motor torque limit value as a function of the position of the clutch command signal and of the speed control lever 62, as per the following C language computer statements:

Rmot_Torq_Lim=Torq_Lim;
if ((Trq_Hld==FALSE))
Rmot_Torq_Lim=0.0;

The Rear Axle Torque Level is set equal to Torq_Lim, which is the desired percentage of available torque to be used for speed control based on the position of the operator's clutch pedal. The resultant Rmot_Torq_Lim is passed to the rear motor controller and it is the maximum percentage of available torque that the controller can apply in its attempt to maintain the commanded rear motor speed. If the load torque is below this level, the commanded motor(wheel) speed is maintained. If the load torque is above this level, the motor (wheel) speed slows down.

The Torq_Hld==FALSE statement checks for the Neutral position 72 of speed control lever 62. Trq_Hld is always True if the operator's lever 62 is not at the zero speed position 74. When the lever 62 is in the zero speed position, the operator can engage or disengage the Trq_Hld switch 78 to make Trq_Hld True in which case the motor controller 17 applies torque (up to the Torq_Lim) to maintain the commanded speed (zero), or False, in which case the operator is commanding free wheeling (neutral) or zero motor torque, regardless of the position of clutch pedal 50.

Step 120 calculates a front motor speed command value, Fmot_Spd_Cmd, required to achieve the desired speed, based on the vehicle speed command value and upon a front gear ratio, as per the following C language computer statements:

Fmot_Spd_Cmd=veh_spd_cmd * FRGrat * Bst; where FRGrat is a ratio between front and rear wheel speeds (it includes the effect of rear tire rolling radius as well as the actual gear reduction. Bst is an effective boost ratio of the front wheel to rear wheel speed to maintain adequate load sharing. Thus, the front motor speed command is the product of the vehicle speed command, the effective gear ratio, and the boost factor.

Simultaneous application of both brake pedals modifies this speed command as described below in connection with step 122.

Step 122 calculates a front motor torque limit value as a function of the position of the pedal 50 and of the speed control lever 62, as per the following C language computer statements:

| | |
|---|---|
| Fmot_Torq_Lim=Torq_Lim; | (1) |
| if ((Trq_Hld==FALSE)) | (2) |
| Fmot_Torq_Lim=0.0; | (3) |
| if (MFWD_On==FALSE) | (4) |
| Fmot_Torq_Lim=0.0; | (5) |
| if ((MFWD_On)&&(MFWD_Auto)) | (6) |
| { | (7) |
| if ((veh_spd_cmd−Auto_maxf)>0.) | (8) |
| Fmot_Torq_Lim=0.0; | (9) |
| if ((veh_spd_cmd+Auto_maxr)<0.) | (10) |
| Fmot_Torq_Lim=0.0; | (11) |
| } | (12) |
| if (Fmot_Spd_Cmd>3000.) | (13) |
| { | (14) |
| if ((Fmot_Torq_Lim<10.)&&(Torq_Lim>10.)) | (15) |

```
    Fmot_Torq_Lim=10.;                              (16)

}                                                   (17)

if((Rt_Brk)&&(Lt_Brk))                          (18)

{                                                   (19)

Fmot_Torq_Lim=Brk_Torq;                         (20)

Fmot_Spd_Cmd=0.0; }                             (21)
```

In statement (1) a front motor torque limit is set based on the position of clutch pedal 50 where Torq_Lim is the desired percentage of available torque to be used for speed control based on the position of the clutch pedal 50. The resultant Fmot Torq_Lim is passed to the front motor controller 21 and it is the maximum percentage of available torque that the controller can apply in its attempt to maintain the commanded front motor speed. If the load torque is below this level, the commanded motor (wheel) speed is maintained. If the load torque is above this level, the motor (wheel) speed slows down.

In statements 2 and 3, the Trq_Hld value represents the status of switch 78, and is always True if the operator's lever 62 is not at the zero speed position 74. When the control lever 62 is in the zero speed position 74, the operator can engage or disengage the Trq_Hld switch 78 to make Trq_Hld True in which case the motor controller applies torque (up to the Torq_Lim) to maintain the commanded speed (zero), or False, in which case the operator is commanding free wheeling (neutral) or zero motor torque, regardless of the position of clutch pedal 50.

With respect to statements 4 and 5, the 3 position switch 56 controls the engagement of the front wheel drive. The 3 positions of switch 56 set MFWD_On to True or False or to a third automatic mode. In the automatic mode, the front wheel drive is engaged (Fmot_Torq_Lim=Torq_Lim) below a speed of Auto_maxf (if moving forward) and is disengaged (Fmot_Torq_Lim=0) above that speed. In reverse and automatic mode, the front wheel drive is engaged (Fmot_Torq_Lim=Torq_Lim) below a speed of -Auto_maxr and is disengaged (Fmot_Torq_Lim=0) above that speed.

Statements 6–12 implement the MFWD_Auto feature.

In statements 13–17, operate to cause the front motor controller 21 to maintain the torque of the front motor 24 at a minimum of 10% of maximum whenever the front motor speed command exceeds 3000 rpm, unless the a lower torque is commanded by the clutch pedal 50.

Statements 18–21 provide a brake pedal override function. To provide front wheel braking torque when both brakes 58,60 are applied (Rt_Brk=True and Lt_Brk=True) statements 18–21 override all other speed and torque commands to the front wheel motor. Whenever both brakes are applied, a retarding torque up to the magnitude of Brk_Torq will be applied to slow the vehicle (regardless of vehicle direction).

Step 124 modifies the front motor torque limit value to zero if the FWD switch 56 is in its OFF, or if the FWD switch 56 is in its AUTO position and the front motor speed exceeds a preset limit speed.

Step 126 sets front motor speed to zero and sets the front motor torque limit value to a preset percentage of maximum available torque at current motor speed if the left and right brake switches 58 and 60 are both on.

Step 128 causes an exit from this subroutine.

Thus, the fully raised position of the pedal 50 represents a 100% current limit, that is 100% of the torque that the motor 24 or 28 is able to exert at its present operating speed. Depressing the pedal 50 rotates the potentiometer 52 and changes the clutch command signal supplied to the VCU 40. The operator inputs a vehicle speed command through the speed control lever 62, which the VCU, by steps 116 and 120, converts to rear and front motor speed commands for the rear electric drive motor 28 and for the front electric drive motor 24. Each of the electric drive motors 24 and 28 is in a closed speed control loop formed by the rotor position sensors 46, 48, and the micro-controllers 21, 23, in which the micro-controllers 21, 23 generate a motor torque command value which is a function of a speed error, which is the difference between the commanded speed calculated from lever 62 in steps 116 and 120 and the actual speed derived from sensors 46, 48. The torque generated by each motor 24, 28 is a function of the motor current. Preferably, the current is also electronically limited by the micro-controllers 21 and 23 in order to protect the motor and the controller. In addition, according to the present invention, the motor current and torque is further limited or varied as a function of the position of pedal 50.

As the pedal 50 is depressed, the VCU 40 responds to the changing clutch command signal from potentiometer 52 by causing the microcontrollers 21, 23 to reduce the current supplied to motors 24, 28 and to thereby limit the torque of the motors until the torque reaches zero at a nearly fully depressed position of pedal 50. From the operator's viewpoint, this system operates and reacts like a mechanical slipping clutch, however, there are no slipping surfaces to wear out, and control is easier to achieve. The system can operate indefinitely at low torque levels without damaging any components. The system allows an operator to move a vehicle slowly and with little force, such as when maneuvering close to buildings or hitching up to implements. This system permits an operator to engage the drive slowly and smoothly, and to precisely control the force exerted. It is possible for the drive axle to be exerting full torque at low or zero speed with the engine essentially at idle. With the clutch/inching pedal, the operator has full control of axle torque, so that the desired level of drive line torque can be maintained, even though one of the operator's cues to drive line torque level, engine noise, is less noticeable. This makes it easier to control the vehicle when hitching up to a mounted implement, for example, With this system, engine power is transmitted to traction drives independent of engine speed, with a mechanically simple design and with an infinitely variable speed ratio.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. In vehicle electric drive system having an internal combustion engine, an electric motor/generator driven by the engine, a first inverter/rectifier coupled to motor/generator, a bus coupled to the first inverter/rectifier, a second inverter/rectifier coupled to the bus, and a traction motor/generator coupled to an output of the second inverter/rectifier, an operator speed control member, and a controller coupled to the second inverter/rectifier for controlling a current output of the second inverter/rectifier as a function of a position of the speed control member, a limit control comprising:

an operator controlled limit control member; and a transducer coupled to the limit control member and generating a limit command signal representing the position of the limit control member, the controller receiving the limit command signal and limiting current supplied by the second inverter/rectifier to the traction motor/generator to a limit current which is a function of the limit command signal so that from an operators viewpoint, in response to manipulation of the operator controlled limit control member, the electric drive system operates and reacts like a mechanical slipping clutch.

2. The control of claim 1, wherein:

the controller, limit control member and transducer cooperate to vary the limit current in response to movement of the limit control member.

3. The control of claim 1, wherein:

a spring biases the limit control member to an upper limit position; and the controller causing the second inverter/rectifier to supply to the traction motor/generator the limit current, but not more than that required to achieve a speed commanded by the speed control.

4. The control of claim 1, wherein:

the limit control member is a foot pedal.

5. The control of claim 1, wherein:

the controller scales the signal from the transducer so that the limit command signal will vary from zero to a maximum value.

6. The control of claim 5, wherein:

the limit control member is movable from a fully raised position to a fully depressed position; and the controller applies an offset to the signal from the transducer so that a limit command signal of zero corresponds to a less than fully depressed limit control member position and a limit command signal of 100 percent corresponds to a less than fully raised limit control member position.

7. In vehicle electric drive system having an internal combustion engine, an electric motor/generator driven by the engine, a first inverter/rectifier coupled to motor/generator, a bus coupled to the first inverter/rectifier, a second inverter/rectifier coupled to the bus, and a traction motor/generator coupled to an output of the second inverter/rectifier, an operator speed control member, and a controller coupled to the second inverter/rectifier for controlling a current output of the second inverter/rectifier as a function of a position of the speed control member, a further control comprising:

an operator controlled foot pedal; and a transducer coupled to the foot pedal and generating a limit signal representing a position of the foot pedal, the controller receiving the transducer signal and limiting current supplied by the second inverter/rectifier to the traction motor/generator to a limit current which is a function of the transducer signal so that from an operator's viewpoint, in response to manipulation of the operator controlled foot pedal, the electric drive system operates and reacts like a mechanical slipping clutch.

8. The control of claim 7, wherein:

the controller, foot pedal and transducer cooperate to vary the limit current in response to movement of the foot pedal.

9. The control of claim 7, wherein:

a spring biases the foot pedal to an upper limit position; and the control unit causing the second inverter/rectifier to supply to the traction motor/generator a maximum amount of current, but not more than that required to achieve a speed commanded by the speed control, when the foot pedal is in its upper limit position.

10. A vehicle electric drive system comprising:

an internal combustion engine;

an electric motor/generator driven by the engine;

a first inverter/rectifier coupled to motor/generator;

a bus coupled to the first inverter/rectifier;

a second inverter/rectifier coupled to the bus;

a traction motor/generator coupled to an output of the second inverter/rectifier;

an operator speed control member;

a controller coupled to the second inverter/rectifier for controlling a current output of the second inverter/rectifier as a function of a position of the speed control member;

an operator controlled foot pedal; and a transducer coupled to the foot pedal and generating a transducer signal representing foot pedal position, said transducer signal being communicated to the controller, the controller limiting current supplied by the second inverter/rectifier to the traction motor/generator to a limit current as a function of the transducer signal so that from an operator's viewpoint, in response to manipulation of the operator controlled foot pedal, the electric drive system operates and reacts like a mechanical slipping clutch.

\* \* \* \* \*